US012619903B2

(12) United States Patent
Wu et al.

(10) Patent No.: US 12,619,903 B2
(45) Date of Patent: May 5, 2026

(54) FAST MINIMUM-WEIGHT PERFECT MATCHING (MWPM) DECODER FOR QUANTUM ERROR CORRECTION

(71) Applicant: Yale University, New Haven, CT (US)

(72) Inventors: Yue Wu, New Haven, CT (US); Lin Zhong, New Haven, CT (US); Namitha Godawatte Liyanage, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 18/437,441

(22) Filed: Feb. 9, 2024

(65) Prior Publication Data

US 2024/0273393 A1 Aug. 15, 2024

Related U.S. Application Data

(60) Provisional application No. 63/444,632, filed on Feb. 10, 2023.

(51) Int. Cl.
*G06N 10/70* (2022.01)
*G06N 10/60* (2022.01)

(52) U.S. Cl.
CPC ............. *G06N 10/70* (2022.01); *G06N 10/60* (2022.01)

(58) Field of Classification Search
CPC ......... G06N 10/70; G06N 10/60; G06N 10/00
USPC ........................................... 714/746
See application file for complete search history.

(56) References Cited

U.S. PATENT DOCUMENTS

| | | | | |
|---|---|---|---|---|
| 11,341,428 | B2 * | 5/2022 | Bourassa .................. | G06E 1/00 |
| 11,901,915 | B1 * | 2/2024 | Campbell ............ | H03M 13/611 |
| 2021/0124640 | A1 * | 4/2021 | Nickerson .............. | G06F 11/10 |
| 2024/0063821 | A1 * | 2/2024 | Zhang ................ | H03M 13/1108 |
| 2024/0171889 | A1 * | 5/2024 | Litinski .................. | G06N 10/00 |
| 2025/0061359 | A1 * | 2/2025 | Delfosse ................ | G06N 10/40 |
| 2025/0068958 | A1 * | 2/2025 | Sankar .................. | G06N 10/20 |

OTHER PUBLICATIONS

Liyanage, et al. "Scalable quantum error correction for surface codes using FPGA." 2023 IEEE International Conference on Quantum Computing and Engineering (QCE). vol. 1. IEEE, 2023.
Godawatte Liyanage, et al. "Distributed Union-Find Decoder and Its FPGA-based Implementation for Scalable Quantum Error Correction." APS March Meeting Abstracts. vol. 2023. 2023.
Vittal, et al. "Astrea: Accurate quantum error-decoding via practical minimum-weight perfect-matching." Proceedings of the 50th Annual International Symposium on Computer Architecture. 2023.

(Continued)

*Primary Examiner* — James C Kerveros
(74) *Attorney, Agent, or Firm* — Saul Ewing LLP; Kathryn Doyle; Sean P. Ritchie

(57) ABSTRACT

Provided herein are methods of solving minimum-weight perfect matching (MWPM) for quantum error correction. The methods include i) partitioning an algorithm into a dual module and a primal module; ii) computing a maximum update length in the dual module; iii) gathering a return value in the dual module, the return value including a growth event or a conflict event; iv) resolving a conflict in the primal module when the return value is the conflict event; and v) setting a growth state in the dual module for each of one or more nodes when the return value is the growth event.

20 Claims, 3 Drawing Sheets

(56)                    References Cited

OTHER PUBLICATIONS

Alavisamani, et al. "Promatch: Extending the Reach of Real-Time Quantum Error Correction with Adaptive Predecoding." Proceedings of the 29th ACM International Conference on Architectural Support for Programming Languages and Operating Systems, vol. 3. 2024.

Fowler, et al. "Topological code autotune." Physical Review X 2.4 (2012): 041003.

Criger, et al. "Multi-path summation for decoding 2D topological codes." Quantum 2 (2018): 102.

Fowler, et al. "Towards practical classical processing for the surface code." Physical review letters 108.18 (2012): 180501.

Fowler, et al. "Minimum weight perfect matching of fault-tolerant topological quantum error correction in average parallel time." arXiv preprint arXiv:1307.1740 (2013).

Higgott "Pymatching: A python package for decoding quantum codes with minimum-weight perfect matching." ACM Transactions on Quantum Computing 3.3 (2022): 1-16.

Delfosse, et al. "Almost-linear time decoding algorithm for topological codes." Quantum 5 (2021): 595.

Wu, et al. "An interpretation of union-find decoder on weighted graphs." arXiv preprint arXiv:2211.03288 (2022).

Wu, et al. "Interpretation of Union-Find Decoder on Weighted Graphs and Application to XZZX Surface Code." APS March Meeting Abstracts. vol. 2022. 2022.

* cited by examiner

Complete graph: O(N^2) edges
Sparse graph: O(N) edges
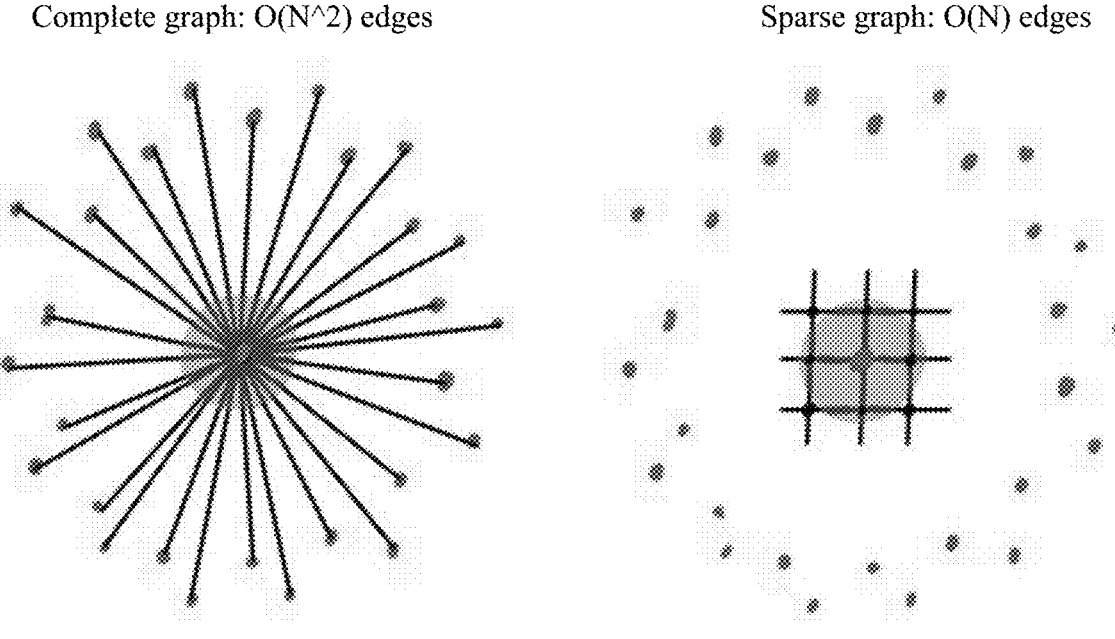
FIG. 4A
FIG. 4B
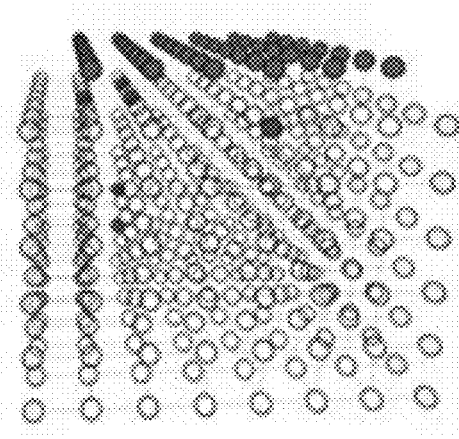
FIG. 5

FAST MINIMUM-WEIGHT PERFECT MATCHING (MWPM) DECODER FOR QUANTUM ERROR CORRECTION

CROSS-REFERENCE TO RELATED APPLICATIONS

The present application claims priority under 35 U.S.C. § 119(c) to U.S. Provisional Patent Application No. 63/444,632, filed Feb. 10, 2023, which application is incorporated herein by reference in its entirety.

STATEMENT REGARDING FEDERALLY SPONSORED RESEARCH OR DEVELOPMENT

This invention was made with government support under DE-SC0019406 awarded by the Department of Energy. The government has certain rights in the invention.

BACKGROUND OF THE DISCLOSURE

Minimum weight perfect matching (MWPM) decoders are widely known for their high accuracy. Although there have been several optimizations that further improved the accuracy of MWPM decoders, there have not been many improvements to the speed of the MWPM decoder over the past 10 years. An O(N) asymptotic complexity MWPM decoder was implemented in (Fowler, Austin G., Adam C. Whiteside, and Lloyd CL Hollenberg. "Towards practical classical processing for the surface code: timing analysis." Physical Review A 86.4 (2012): 042313.), and an O(1) complexity parallel MWPM decoder was proposed in (Fowler, Austin G. "Minimum weight perfect matching of fault-tolerant topological quantum error correction in average O(1) parallel time." arXiv preprint arXiv: 1307.1740 (2013).). Additionally, a fast but approximate MWPM decoder (namely "local matching") with roughly O(N) complexity was implemented in (Higgott, Oscar. "PyMatching: A Python package for decoding quantum codes with minimum-weight perfect matching." ACM Transactions on Quantum Computing 3.3 (2022): 1-16.).

However, as high throughput and low latency are both important to realize a fault-tolerant quantum computer, there remains a need in the art for methods that improve on existing decoders by providing increased throughput and decreased latency. The present invention addresses this need.

SUMMARY OF THE DISCLOSURE

In one aspect a method of solving minimum-weight perfect matching (MWPM) for quantum error correction includes i) partitioning an algorithm into a dual module and a primal module; ii) computing a maximum update length in the dual module; iii) gathering a return value in the dual module, the return value including a growth value or a conflict value; iv) resolving a conflict event in the primal module when the return value is the conflict value; and v) setting a growth state for the node in the dual module when the return value is the growth value. In some embodiments, the growth state for the node includes grow, stay, or shrink. In some embodiments, the method further includes repeating steps ii through v until the step of computing the maximum update length returns an empty value.

In some embodiments, the algorithm works on the dual module and the primal module simultaneously. In some embodiments, the method further includes growing all variables in the dual module in parallel. In some embodiments, the growing includes a multiple-tree growth strategy. In some embodiments, the algorithm includes the blossom algorithm. In some embodiments, the method further includes, in the dual module, at least one of adding a syndrome event to one of the one or more nodes, forming a blossom node, removing a blossom node, or setting at least one edge to 0 weight when an erasure event is detected. In some embodiments, the dual module and the primal module are abstracted from implementation.

In some embodiments, the step of computing the maximum update length comprises a time complexity of O(1). In some embodiments, the step of setting the growth state comprises a time complexity of O(1) for each of the one or more nodes. In some embodiments, the gathering step includes a time complexity of O(log(N)), where N is the number of edges of the node. In some embodiments, the gathering step is completed in a single clock cycle. In some embodiments, the method includes a constant clock cycle with O(log(N)) clock cycles.

In some embodiments, the return value includes the conflict value when one or more conflict events is detected in at least one edge of the node. In some embodiments, the one or more conflict event includes a positive growing length of any of the at least one edges nodes leading to unsafe exploratory region overlapping. In some embodiments, the conflict value includes at least two conflict events. In some embodiments, the at least two conflict events are gathered in parallel. In some embodiments, the at least two conflicts are gathered into a single conflict. In some embodiments, the gathering into the single conflict includes a tree structure gathering.

BRIEF DESCRIPTION OF THE DRAWINGS

For a fuller understanding of the nature and desired objects of the present invention, reference is made to the following detailed description taken in conjunction with the accompanying figures wherein like reference characters denote corresponding parts throughout the several views.

FIGS. 4A-B are images showing different graph structures. (A) Complete graph with O(N^2) edges. (B) Sparse graph with O(N) edges.

FIG. 5 is an image illustrating the dynamic fusion boundary in streaming decoding.

DETAILED DESCRIPTION OF THE DISCLOSURE

Definitions

Figure 1:
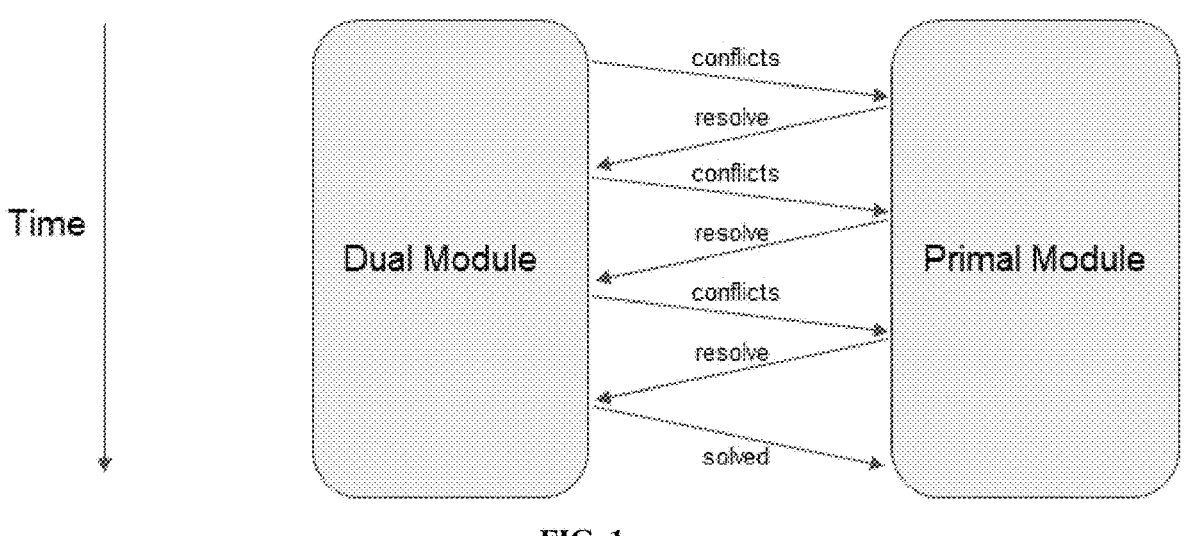
FIG. 1 is an image showing a schematic of a decoding method.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

The articles "a" and "an" are used herein to refer to one or to more than one (i.e., to at least one) of the grammatical object of the article. By way of example, "an element" means one element or more than one element.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION

Provided herein are articles and methods of solving minimum-weight perfect matching (MWPM) for quantum error correction (QEC). In some embodiments, the method includes partitioning an algorithm for constructing maximum matching (e.g., a blossom algorithm) into a dual module and a primal module, and implementing the dual module operations in parallel on any suitable graph. In some embodiments, for example, the graph includes at least one node, with each node corresponding to either (1) a defect vertex that needs to be matched or (2) a blossom that consists of multiple children nodes. The defect vertex, which is indicated by non-trivial stabilizer measurement, is only available when running the quantum circuit, and therefore is online information. Each node has a dual variable, which is defined as the radius of the region of the node. The growing or shrinking of a node corresponds to increasing or decreasing of the dual variable, respectively. Although, the dual variable is defined as the "radius" of the node, as will be appreciated by those skilled in the art, the region of the node need not form a circular shape. As such, the term "radius" may be used interchangeably with the term "perimeter," and should not be interpreted as limiting the shape of any given node.

In some embodiments, each node includes one or more vertices (those covered in the region) and one or more partial edges (the parts that are covered in the region). In such embodiments, each vertex corresponds to a stabilizer measurement result and each edge corresponds to an independent error source. The vertices are known offline given a specific quantum error correction code, while the partial edges are known offline given a specific noise channel (error model). Although discussed herein primarily with respect to corresponding edges and vertices, as will be understood by those skilled in the art, the method is not so limited and may be applied to any other suitable graph variants.

Turning to implementation of the method, in some embodiments, the method includes computing a maximum update length in the dual module; and determining a problem stage based upon the maximum update length. In some embodiments, determining the problem stage includes determining that the problem has been solved when the maximum update length is empty, determining that a conflict needs to be resolved when the maximum update length indicates a conflict, or determining that the nodes are safe to grow when the maximum update length is a positive value. In some embodiments, the steps of computing the maximum update length and determining the problem stage are repeated until the maximum update length returns an empty value, indicating that the problem has been solved (FIG. 1).

Figure 2:
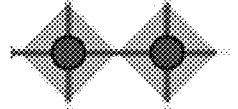
FIG. 2 is an image showing an example of a conflict event.

In some embodiments, computing the maximum update length includes gathering a return value in the dual module. The return value includes either a growth value (e.g., a positive length to grow safely) or a conflict value (e.g., one or more conflict events). In such embodiments, the dual module determines the state of each edge in a node, where a conflict event is identified for any positive growing length in any node or edge leading to unsafe exploratory region overlapping. For example, in some embodiments, the conflict event represents two nodes that are already touching and both in a grow state (FIG. 2). Additionally or alternatively, in some embodiments, the conflict represents a fully grown edge with a grow+grow, grow+stay, or stay+grow state. In some embodiments, to ensure correctness in existence of 0-weight edges prior to gathering the return value, computing the maximum update length includes first shrinking to a minimum any nodes set to shrink, and then growing to a maximum any nodes set to grow.

When one or more conflict events are detected in any edge, the dual module gathers a conflict value for the node and the one or more conflict events are resolved by the primal module. In some embodiments, the conflict value is gathered with a tree structure. In such embodiments, two or more conflicts are gathered into a single conflict by simply choosing any one. Accordingly, in some embodiments, the conflict value indicates that at least one conflict event has been detected, but may not report all of the conflicts detected. In some embodiments, the parallel gathering of the conflict events provides increased throughput without penalty of latency. For example, noting that the returned conflicts could be multiple conflict events, if a list of 16 conflict events is returned, then each of the conflicts is selected from $\frac{1}{16}$ of all the edges, which provides increased speed because batch operation gives more throughput without penalty of latency (each of the 16 conflict events are gathered in parallel).

Alternatively, when no conflict events are detected in any edge, the dual module gathers a growth value for the node, indicating it is safe for the node to grow. In such embodiments, the dual module sets a growth state for the node. The growth state in each node may be GROW, STAY, or SHRINK. As will be appreciated by those skilled in the art, when the growth state of a node is set to GROW, each edge in the node will grow by the same length. Similarly, when the growth state of a node is set to STAY, each edge in the node will stay the same, while in the SHRINK state each edge in the node will shrink by the same length. In some embodiments, setting the growth state for a node may be done in O(1) time because there is no synchronization. Additionally or alternatively, in some embodiments, setting the growth state for a node may be done in O(log(N)) time to accommodate propagating the same message ("grow (length)") to N nodes in a tree-structured fanout.

The blossom algorithm works on the dual and primal problems simultaneously. Additional functions that may be called from the primal module include, but are not limited to, add_syndrome_node(vertex); add_blossom(nodes); remove_blossom(blossom_node); set_grow_state(node, state: GROW|STAY|SHRINK); load_erasures(edges); or a combination thereof. The add_syndrome_node(vertex) function includes adding a syndrome event to specific node and is O(1) time only affecting the specific vertex. The add_blossom(nodes) function forms a blossom by a list of children nodes (each node could be either a syndrome or a blossom, i.e. there could be cascaded blossom) and is O(log(nodes)) time because arbitrarily long messages cannot be sent in hardware and thus it need to be sent one-by-one. However, a blossom with K nodes is at most $p^K$ probability, and therefore the probability of this event to happen is exponentially suppressed with K. The remove_blossom(blossom_node) function breaks a blossom node into its children nodes and is O(1) time because the breaking operation happens in parallel. The set_grow_state(node, state: GROW|STAY|SHRINK) function updates the internal state of all vertices and edges that are inside the node and is O(1) time for a specific node. The load_erasures(edges) function sets some of the edges to 0 weight if an erasure event is detected. This function is used only when decoding erasure errors alongside the normal Pauli errors and is O(len(edges)) time because it needs to be send multiple rounds.

Figure 3:
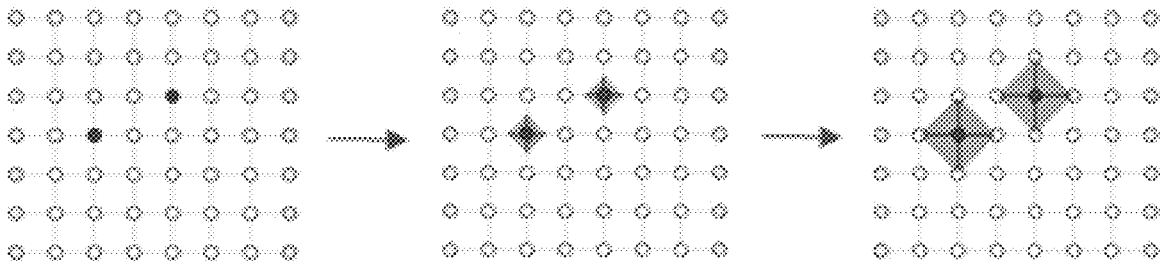
FIG. 3 is a schematic showing the parallel growth according to an embodiment of the method disclosed herein.

In some embodiments, implementing the dual module operations in parallel includes implementing a multiple-tree growing strategy in the dual module. In some embodiments, the multiple-tree growing strategy of the dual module enables all of the dual variables to grow at once (FIG. 3). For example, the dual variables may be executed in parallel using suitable hardware, such as, but not limited to, field programmable gate array (FPGA), ASIC, or any synchronized processing units that include low-latency, high-bandwidth inter-processing-unit communication. In some embodiments, the dual module and the primal module are abstracted from implementation, which further supports internal parallelism. In some embodiments, the method includes storing a small and constant amount of data for each vertex or edge that is enough for implementing corresponding interfaces. In such embodiments, each edge can be occupied by multiple different nodes while storing only enough data to implement all the required interfaces for a dual module.

In contrast to existing single-tree growing strategies, which update a single alternating tree sequentially and require time proportional to the size and maximum degree of vertices in the decoding graph, the multiple-tree growing strategy employed in the methods disclosed herein enables constant time query of conflict events in the blossom algorithm. For example, in some embodiments, with N edges, all operations of the dual module can be implemented on hardware with O(1) clock cycles, at a clock cycle of O(log (N)). Additionally or alternatively, in some embodiments, the methods disclosed herein output multiple conflict events in a single cycle, which improves the throughput and/or reduces the latency of the dual module. Accordingly, in some embodiments, the method is scalable to code distance of d=20+ with lus average latency on any suitable hardware. For example, in one embodiment, a dual module implemented at 100 MHz on FPGA can easily reach an average latency of lus at code distance of 20. Without wishing to be bound by theory, it is believed that existing implementations are not capable of providing such a decoding latency for code this size. As will be appreciated by those skilled in the art, although discussed herein primarily with respect to an average latency of lus, the disclosure is not so limited and may include any other suitable latency based upon various conditions, such as the number of cores, threads, or partitions.

Additionally, since the methods disclosed herein are not limited to a specific decoding graph, they can be extended to arbitrary decoding graphs dynamically. For example, in some embodiments, unlike existing MWPM methods, which typically use a complete graph having O(N^2) edges (FIG. 4A), the methods disclosed herein utilize a sparse decoding graph having O(N) edges (FIG. 4B). Accordingly, the methods disclosed herein can be used in different systems without changing the hardware design; facilitate production of general decoder ASIC for acceleration purposes; and/or can be used in systems with quantum erasure errors, which need to dynamically change the weight of some edges in the decoding graph.

In some embodiments, the dual module is virtualized. In such embodiments, the physical dual module, which is implemented in hardware, can be used as multiple virtual dual modules. Additionally or alternatively, multiple physical dual modules may be fused as a single bigger virtual dual module. Each virtual dual module provides the same functionality as the physical dual module, which creates the impression of multiple physical dual modules at the cost of slower run-time for each virtual dual module. Accordingly, the methods disclosed herein are not limited to specialized hardware.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

Example 1

This Example shows pseudo code for the dual module internal parallelism method disclosed in the detailed description above.

Pseudo Code (Overview)

```
loop {
    maximum_update_length = dual_module.compute_maximum_update_length( )
    if (maximum_update_length.is_empty( )) break    // problem solved, nothing
    more to deal with
    if (maximum_update_length.is_none_zero_growth( )) {    // no conflict found,
    safe to grow
    dual_module.grow(maximum_update_length.get_none_zero_growth( ))      //
    based on the state of each node, it could be GROW, STAY or SHRINK. STAY
    node will not change here, and those GROW and SHRINK will increase or
    decrease their "radius" by the given length
    } else {
        conflicts = maximum_update_length.get_conflicts( )
        primal_module.resolve(conflicts, dual_module)
    }
}
```

The two italicized functions in the code above are O(1) time complexity on a FPGA, which is explain further in the additional pseudo code below.

Pseudo Code: Dual Module (Compute Maximum Update Length)

Function compute_maximum_update_length( )
(return value is either a positive length to grow safely, or it's a list of conflict events; a conflict event happens if any positive growing length will lead to unsafe exploratory region overlapping, e.g., if two nodes already touch each other like above, and both of them are in the GROW state)
self.prepare_all( )// this is used to ensure correctness in existence of 0-weight edges: first SHRINK nodes are shrinking to minimum and then GROW nodes are growing to maximum. If no 0-weight edges (normal case), takes 1 clock cycle
For each edge (parallel in hardware):
if edge is fully grown, then conflict if the state is GROW+GROW, GROW+STAY or STAY+GROW
The above check is implemented in combinatorial logic (within a single clock cycle)
Gather the information:
(note that all the conflicts are not necessarily reported, only some need to be reported if any conflict exists)
The gathering is a tree structure, two conflicts are gathered into a single conflict by simply choosing any one
Given N edges, the gathering can be done in O(log(N)) time, which usually fits into an single clock cycle of appropriate speed. Alternatively, a constant clock cycle may be used with O(log(N)) clock cycles.
Note: the returned conflicts could be multiple conflict events. For example the list is 16 conflict events, then each of the conflicts is selected from $\frac{1}{16}$ of all the edges. This also provides increased speed because batch operation gives more throughput without penalty of latency here: each of the 16 conflict events are gathered in parallel

Pseudo Code: Dual Module (Grow)

```
Function grow(length):
    (length is the amount to "grow" for each node, based on the state:
GROW, STAR or SHRINK; there's no return value)
    For each edge (parallel in hardware):
        For two vertices incident to this edge:
```

-continued

```
        If node is GROW, then increase the expanded amount on this side
        of the edge
        If node is SHRINK, then decrease the expanded amount on this
        side of the edge
```

Note: this function is also O(1) time because there is no synchronization. However, in some instances, propagating the same message "grow(length)" to all the nodes takes O(log(N)) time, because the fanout of transistors is limited and copying the same signal to N nodes will require O(log (N)) amount of time for a tree-structured fanout.

The following implementations of the methods disclosed herein and represented by the pseudo code above are also considered.

Streaming Decoding

Figure 6:
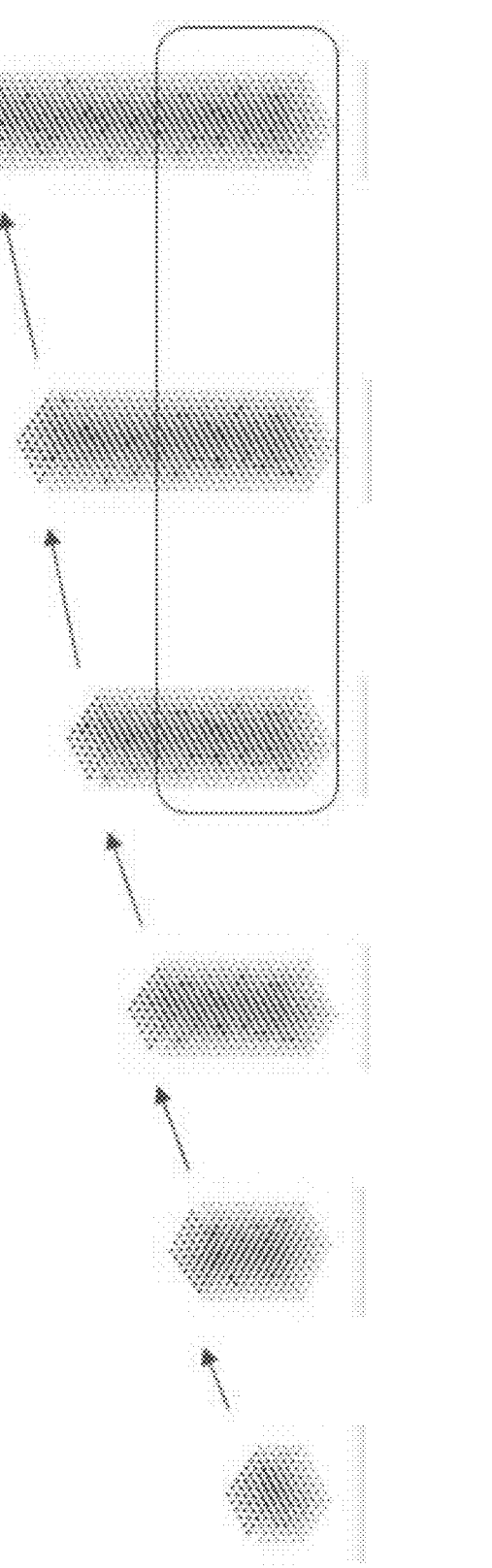
FIG. 6 is an image illustrating the vertices that are distal from the dynamic boundary and unlikely to be changed.

The present inventors have verified the feasibility of the dynamic fusion boundary in software (the blue vertices (top) in FIG. 5). In this way, streaming decoding may be used to minimize latency. That is, once a new layer of syndrome is ready, the algorithm can proceed to a stable state. Every time a new round is coming in, statistically it only needs to deal with local changes, because a large node is exponentially unlikely with its radius. This sacrifices the throughput (because moving the dynamic boundary introduces overhead) but it minimizes the latency (because the time of last round received to the time a correction is out always consumes a very small amount of time). A verified example in software is shown in FIG. 6, where the vertices far away from the dynamic boundary (e.g., the vertices in the rectangular box) are almost never changed again.

Efficient Hardware Architecture

Each vertex and edge consumes some of the limited hardware resources (transistors: logic or memory). However, as discussed above, in streaming decoding the vertices at the bottom will almost never be accessed again. As such, these vertices can be "swapped" out of the active dual module (it's like saving to file). That is, the BRAM resources distributed over the FPGA can be leveraged to store those unused vertices and edges. Should the stored vertices ever need to be accessed again, they can be "swapped" back into the active dual module for performance of the operations. The present inventors have verified the feasibility of accessing on demand in software: only those needed dual module are invoked again, and most of them will be swapped out forever.

Multiplexing Decoder

In view of the technique to swap between different dual modules discussed above, multiple decoders can be run simultaneously on the same dual module. This is like multiplexing a computer for many people to use, and is useful when the latency requirement is already met (especially in near-term experiments where code distances are very small and easy to reach the requirement). Multiple decoders can run on the same dual module, although each of them will have slower speed because they are time-sharing the same "computer."

Considering the real case: the primal module also needs to handle the conflict events, which takes time. As such, even if there is only one decoding problem to solve, the dual module will likely be idle for a portion of time (e.g., 50% of the time) while waiting of the primal module to do its job. In this case, multiplexing can pipeline the processing and increase the throughput without increasing the latency.

General Decoding Graph Support

In some cases, the decoding graph structure will not be known beforehand. More specifically, as experimentalists haven't decided the most promising quantum computer platform and the most promising code, the code structure can change over time.

However, the methods disclosed herein support arbitrary decoding graphs for the fixed dual module hardware, thus enabling the production of a single decoding acceleration ASIC for use on different quantum hardware. In particular, the methods disclosed herein support 0-weight edges for the dual module. A 0-weight edge essentially "combines" the two vertices together, and the combined vertices can be viewed as a single vertex with edges connecting to vertices originally incident to either of them. In this way, the method increases the degree of a vertex (connecting to more vertices) at the cost of decreasing the number of available vertices. This can be used to support general graph structure (i.e., sacrifice the maximum size of code supported in exchange for supporting more complex decoding graphs). By providing an efficient way to set weights in the graph, the architecture disclosed herein can support arbitrary decoding graph with non-negative weights.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

10

What is claimed is:

1. A method of solving minimum-weight perfect matching (MWPM) for quantum error correction, the method comprising:
   i) partitioning an algorithm into a dual module and a primal module;
   ii) computing a maximum update length in the dual module;
   iii) gathering a return value in the dual module, the return value including:
      a growth value; or
      a conflict value;
   iv) resolving a conflict event in the primal module when the return value is the conflict value; and
   v) setting a growth state for a node in the dual module when the return value is the growth value.

2. The method of claim 1, further comprising repeating steps ii through v until the step of computing the maximum update length returns an empty value.

3. The method of claim 1, wherein the algorithm works on the dual module and the primal module simultaneously.

4. The method of claim 1, further comprising growing all variables in the dual module in parallel.

5. The method of claim 4, wherein the growing includes a multiple-tree growth strategy.

6. The method of claim 1, wherein the algorithm includes the blossom algorithm.

7. The method of claim 1, wherein the dual module and the primal module are abstracted from implementation.

8. The method of claim 1, wherein the step of computing the maximum update length comprises a time complexity of $O(1)$.

9. The method of claim 1, wherein the step of setting the growth state comprises a time complexity of $O(1)$ for each of the one or more nodes.

10. The method of claim 1, wherein the return value includes the conflict value when one or more conflict events is detected in at least one edge of the node.

11. The method of claim 10, wherein the one or more conflict event includes a positive growing length of any of the at least one edges nodes leading to unsafe exploratory region overlapping.

12. The method of claim 10, wherein the conflict value includes at least two conflict events.

13. The method of claim 12, wherein the at least two conflict events are gathered in parallel.

14. The method of claim 13, wherein the at least two conflicts are gathered into a single conflict.

15. The method of claim 14, wherein the gathering into the single conflict includes a tree structure gathering.

16. The method of claim 1, wherein:
   the gathering step includes a time complexity of $O(\log(N))$; and
   N is the number of edges of the node.

17. The method of claim 16, wherein the gathering step is completed in a single clock cycle.

18. The method of claim 16, wherein the method includes a constant clock cycle with $O(\log(N))$ clock cycles.

19. The method of claim 1, wherein the growth state for the node includes grow, stay, or shrink.

20. The method of claim 1, further comprising, in the dual module, at least one of adding a syndrome event to one of the one or more nodes, forming a blossom node, removing a blossom node, or setting at least one edge to 0 weight when an erasure event is detected.

\* \* \* \* \*